(12) United States Patent
Cheever et al.

(10) Patent No.: US 6,443,027 B1
(45) Date of Patent: *Sep. 3, 2002

(54) BRAKE ACTUATING SYSTEM

(75) Inventors: John D. Cheever; Michael W. Larson, both of Chicago; Andrew J. Caron, Brookfield; Scott A. McLaughlin, Evanston; David Zimberoff, Chicago, all of IL (US)

(73) Assignee: SRAM Corporation, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,225

(22) PCT Filed: Jan. 21, 1997

(86) PCT No.: PCT/US97/00763

§ 371 (c)(1),
(2), (4) Date: Jul. 24, 1998

(87) PCT Pub. No.: WO97/27405

PCT Pub. Date: Jul. 31, 1997

Related U.S. Application Data

(60) Provisional application No. 60/010,666, filed on Jan. 26, 1996.

(51) Int. Cl.[7] .................................................. F16C 1/10
(52) U.S. Cl. ................... 74/502.2; 74/489; 74/501.5 R; 74/506; D12/179
(58) Field of Search ............................... 74/502.2, 489, 74/475; D12/114, 179; 188/24.11

(56) References Cited

U.S. PATENT DOCUMENTS

| | | | | |
|---|---|---|---|---|
| 2,854,857 A | | 10/1958 | Gleasman et al. ............. 74/489 |
| 3,362,238 A | * | 1/1968 | Hayashi et al. ............. 74/502.2 |
| 4,088,040 A | * | 5/1978 | Ross-Myring ............. 74/501 R |
| 4,132,296 A | * | 1/1979 | Evett .......................... 192/4 R |
| 4,156,371 A | * | 5/1979 | Juy .............................. 74/489 |
| 4,193,318 A | * | 3/1980 | Golobay ....................... 74/489 |
| D264,700 S | * | 6/1982 | Geney ........................ D12/114 |
| 4,437,357 A | * | 3/1984 | Ozaki et al. ................... 74/475 |
| 4,461,189 A | * | 7/1984 | Rottenkolber et al. ........ 74/489 |
| 4,658,667 A | | 4/1987 | Schuller ....................... 74/475 |
| 4,840,081 A | | 6/1989 | Nagano ..................... 74/502.2 |
| 5,176,042 A | * | 1/1993 | Bean et al. ................ 74/502.2 |
| 5,448,927 A | | 9/1995 | Lumpkin .................... 74/502.2 |
| 5,575,178 A | | 11/1996 | Wu ............................... 74/489 |
| 5,674,142 A | * | 10/1997 | Jordan .......................... 474/80 |
| D386,734 S | * | 11/1997 | Nishimura .................. D12/179 |
| 5,946,978 A | * | 9/1999 | Yamashita .................. 74/502.2 |
| 5,979,266 A | * | 11/1999 | Nagano ..................... 74/502.2 |
| 6,053,068 A | * | 4/2000 | Yamashita et al. ......... 74/502.2 |

FOREIGN PATENT DOCUMENTS

| | | | |
|---|---|---|---|
| DE | 2900374 | 8/1979 | ............ B62H/1/02 |
| EP | 0285517 | 5/1988 | ............ G05G/1/04 |
| EP | 0 515 160 A | 11/1992 | |
| EP | 0 593 842 A | 4/1994 | |
| FR | 670628 | 12/1929 | |
| JP | 7-9693 | * 2/1995 | ................ 74/502.2 |

* cited by examiner

Primary Examiner—Vinh T. Luong
(74) Attorney, Agent, or Firm—Milan Milosevic; Lisa Wunderlich

(57) ABSTRACT

A brake operating device (30) is configured such that actuation of the brake lever (34) around the lever pivot (36) displaces the cable (38) in a direction transverse to the cable length toward the lever pivot (36), as the user is actuating the brake lever (34). This provides at least a 33% increase in mechanical advantage over the actuation range of the brake lever (34).

13 Claims, 5 Drawing Sheets

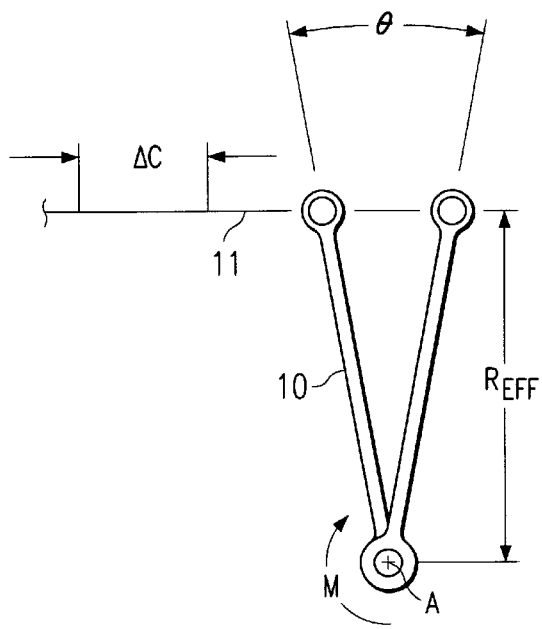
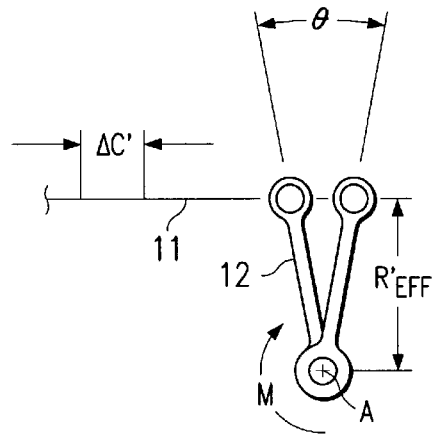
FIG. 1
FIG. 2
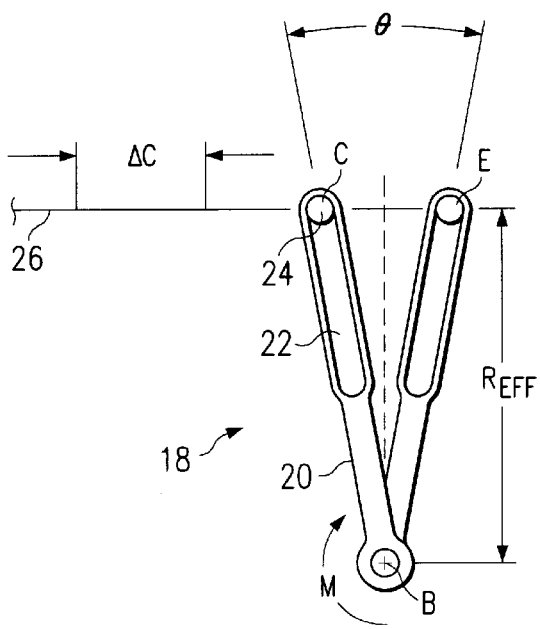
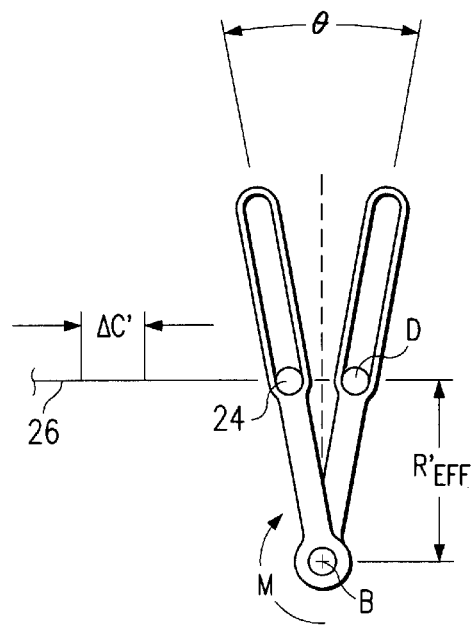
FIG. 3
(PRIOR ART)
FIG. 4
(PRIOR ART)

BRAKE ACTUATING SYSTEM

RELATED APPLICATIONS

This application claims priority to provisional application No. 60/010,666, filed Jan. 26, 1996.

TECHNICAL FIELD

This invention relates in general to hand-actuated bicycle brakes, and more particularly to a brake system exhibiting an increase in mechanical advantage over the range of motion of a brake lever.

BACKGROUND OF THE INVENTION

Bicycle brakes can broadly be classified as handlebar brakes and pedal brakes, depending upon the location where a rider actuates the brakes. As the names suggest, handlebar brakes are actuated at the bicycle handlebar by a rider squeezing a brake handle of a brake lever assembly against the handlebar with his hands, and pedal brakes are actuated at the bicycle pedals. The present invention is an improvement to handlebar brakes.

Numerous types of bicycle brake mechanisms are known in the art, including drum brakes, cantilever brakes, disk brakes, caliper brakes and V-brakes™. One common feature of these brake mechanisms is that the braking force is a function of the force applied to a brake cable extending between the brake mechanism and a brake lever assembly.

Typically a brake lever assembly consists of a brake handle including a finger grip bar and a transverse mounting arm. The mounting arm is attached to the bicycle handlebar (denoted as 100 in FIGS. 6 and 7) by a mounting bracket for pivotal movement relative to the mounting bracket about a fixed axis. The brake cable is attached to the mounting arm at a selected distance from the fixed axis. As the finger grip bar is squeezed by a rider, the mounting arm pivots, increasing the tension on the brake cable, thereby actuating the brake mechanism. Once the brake mechanism is adjusted, the braking force is a function of how hard the finger grip bar is squeezed. How hard the finger grip must be squeezed and how far it must travel to provide a given braking force is known as the "feel" of the brakes.

Bicyclists, particularly avid bicyclists, each have a preferred feel for their bicycle brakes. Riders tend to anticipate the braking force that will result based upon the feel of their brakes. This feel is particularly important in high performance bicycling, such as off-road mountain biking, where applying too much braking force under certain conditions can cause the wheels to lock, resulting in a potentially dangerous loss of rider control. Likewise, too little braking force can have disastrous consequences. Thus, not only is a particular brake feel a matter of user preference, in performance situations a consistent feel contributes to rider safety. To complicate matters, as brake pads wear, the feel of brakes can vary during a ride, particularly during off-road biking where dirt and grit increase brake pad wear and where brakes must be used often and aggressively.

With a conventional brake lever assembly, in order for a bicyclist to obtain desired feel for the handlebar brakes, the brake mechanism itself must be adjusted. This is a time consuming and difficult process requiring special tools. Adjustments are particularly difficult under field conditions where a bicyclist either does not have the necessary tools or does not want to take the time to adjust the brake mechanism.

An alternative known in the art to adjustment to the brake mechanism to alter the brake feel, is providing a structure in the brake lever assembly for varying the perpendicular distance between the fixed axis and the brake cable. This distance is known as the pivot arm. Known prior art devices provide a plurality of holes along the length of the mounting arm at various distances from the fixed axis. While this structure does provide for coarse adjustment of the brake feel, the adjustment is only among pre-selected distances between the fixed axis and the point of attachment of the brake cable. Thus, only a limited number of pivot arm distances, and therefore brake feels, are available. In addition, while this structure does not require disassembly of the brake mechanism to adjust the brake feel, it does require disassembly of the brake lever assembly to reposition the point of attachment of the brake cable to the mounting arm. Thus, adjustment of the brake feel with this structure is time consuming and requires tools which might not be available under field conditions.

Another prior art device employs a slotted lever mounting arm whereby the point of attachment of the brake cable is allowed to transition between varying distances with respect to the fixed axis. Although the noted device provides a varying brake feel, the device also suffers from several drawbacks. The most significant drawback is the abrupt transition of the mechanical advantage and, hence, the force applied to the brake cable. The mechanical advantage is inversely proportional to the pivot arm. The smaller the pivot arm, the greater the power or braking force applied to the brake cable. Therefore, it is crucial that the increase in mechanical advantage be smoothly varying and therefore predictable.

SUMMARY OF THE INVENTION

A brake operating device according to one aspect of the invention includes a mounting brake attached to a bicycle handlebar which has a cable guide. A brake lever is pivotally attached to the mounting bracket. One end of the brake cable is routed along the cable guide and is attached to the brake lever at a fixed point, thereby forming an effective cable attachment point. The mounting bracket and the brake lever are configured, and the effective cable attachment point disposed relative to the lever pivot, such that actuation of the brake lever about the lever pivot displaces the cable in a direction transverse to the cable length toward the lever pivot. This provides at least a 33% increase in mechanical advantage over the actuation range of the brake lever from a fully retracted to a fully deflected position.

BRIEF DESCRIPTION OF THE DRAWINGS

Further aspects of the invention and their advantages will be discerned with reference to the appended drawings, in which like characters identify like parts and in which:

FIGS. 1 and 2 are schematic diagrams illustrating the rotation of levers having two effective radii;

FIGS. 3 and 4 illustrate the operation of a prior art, slotted brake lever system;

DETAILED DESCRIPTION OF THE INVENTION

Figure 5:
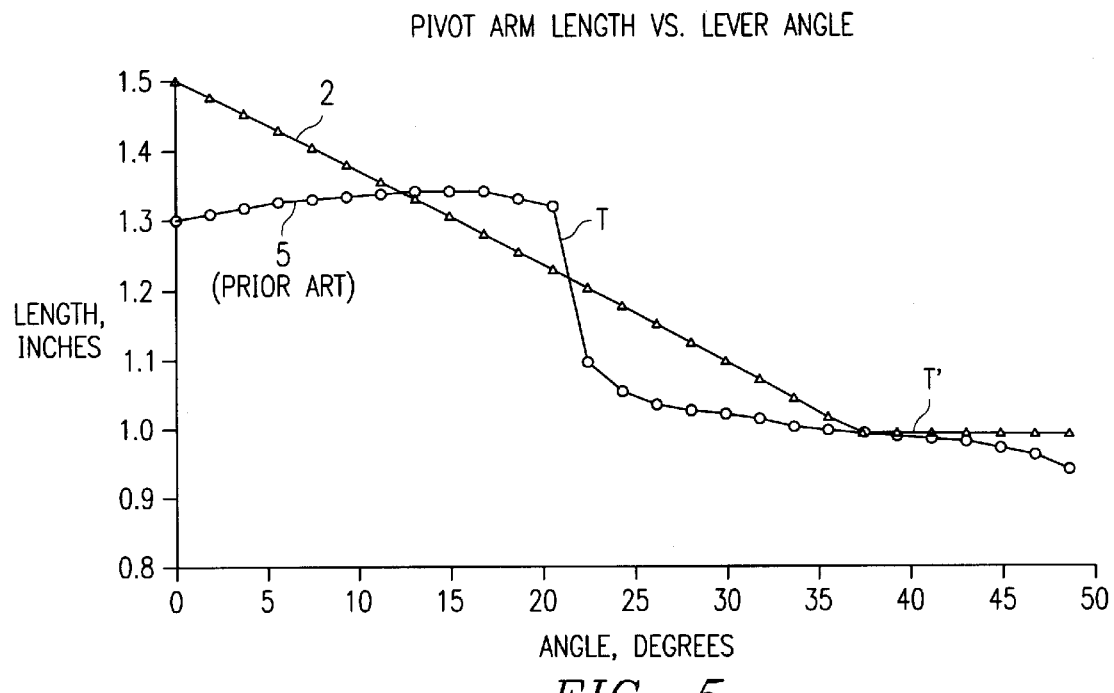
FIG. 5 is a graph of pivot arm length versus lever angle for a prior art brake operating system and a brake operating system according to the invention.

For a typical V-brake™ system, an optimum lever assembly would provide maximum displacement and minimal caliper force over the transition period, defied as the onset of braking through initial brake contact (i.e. calipers fully retracted through caliper contact with the rims), and minimum displacement and maximum caliper force thereafter. By the term caliper force it is meant the braking force resulting from a predetermined mechanical advantage associated with the brake lever mechanism.

As illustrated in FIGS. 1 and 2, such characteristics may be achieved through the use of a lever or levers having two effective radii. It is well known that rotation of a brake lever 10 having an effective radius $R_{EFF}$ over a small angular displacement $\theta$ will produce brake cable 11 displacement $\Delta C$ (See FIG. 1).

As indicated in FIG. 2, if the effective radius $R'_{EFF}$ of the lever arm 12 is reduced, i.e., $R_{EFF}/2$, the cable displacement $\Delta C'$ over the same angle of rotation $\theta$ is proportionately reduced. Further, for a given input moment M about point A, the resultant force imparted to the brake cable 11 is inversely proportional to the effective radii, $R_{EFF}$, $R'_{EFF}$. Thus, for the lever arm 12, illustrated in FIG. 2, having an effective radius $R'_{EFF}$, the force imparted to the brake lever cable 11 is $2M/R_{EFF}$.

As stated above, various brake lever configurations and mechanisms have been employed in an attempt to achieve the above noted mechanical characteristics. The most commonly employed lever mechanism includes a sliding point. Such a mechanism is illustrated in FIGS. 3 and 4. In the noted mechanism, indicated generally at 18, a brake lever 20 includes an elongated slot 22 disposed on the end of the lever 20 opposite pivot B. The slot 22 is adapted to slidably receive a cable roller 24 which is operatively connected to a brake cable 26.

Figure 5A:
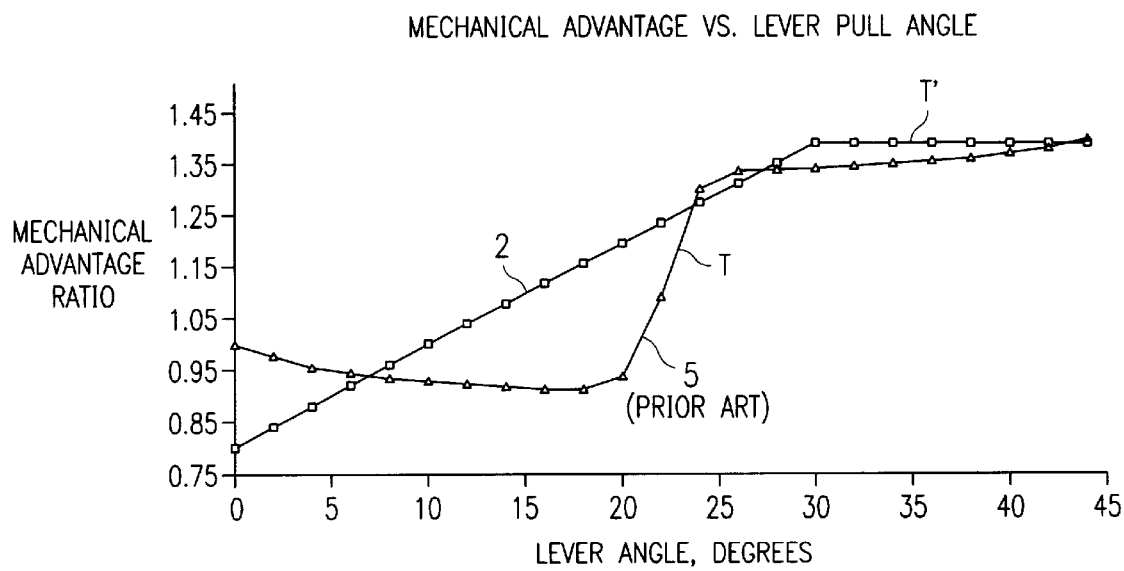
FIG. 5a is a graph of mechanical advantage versus lever pull angle of a prior art brake operating device and a brake operating device according to the invention.

As illustrated in FIG. 3, as the lever 20 is rotated over angular displacement $\theta$, and the roller 24 retained at position C, the lever produces a similar cable displacement $\Delta C$. However, in operation, as illustrated in FIG. 4, the roller 24 transitions to a point D (with an effective radius $R'_{EFF}$) and produces cable displacement $\Delta C'$. FIGS. 5 and 5a illustrate graphs of pivot arm length versus lever angle, and mechanical advantage versus lever pull angle, respectively, for a prior art system 5 corresponding to that shown in FIGS. 3 and 4, and a system 2 according to the invention. In the prior art system 5, the transition (denoted T) from point C ($R_{EFF}$) to D ($R'_{EFF}$) for the prior art system 5, is quite abrupt, producing undesirable and, in many instances, hazardous braking characteristics.

Other prior art devices achieve a moderate mechanical advantage increase (up to 30%) over the lever rotational range even with fixed cable attachment points. However, in such devices, most of the mechanical advantage increase occurs near the end of the lever rotational range instead of the most used portion—the first 30 degrees—of the lever rotational range. Accordingly, such devices are inefficient and do not contribute to a responsive brake feel.

The present invention substantially reduces or eliminates the disadvantages and shortcomings associated with prior art brake mechanisms. As discussed in detail below, the brake mechanism of the invention provides the optimal, maximum displacement and minimum caliper force over the transition period, and minimum displacement and maximum force thereafter. A key characteristic of the invention is that the transition from the maximum to minimum displacement (and minimum to maximum force) is substantially uniform. Additionally, according to the invention, the increased mechanical advantage of slotted levers 20 is achieved without the use of complex slotted mechanisms.

Figure 6:
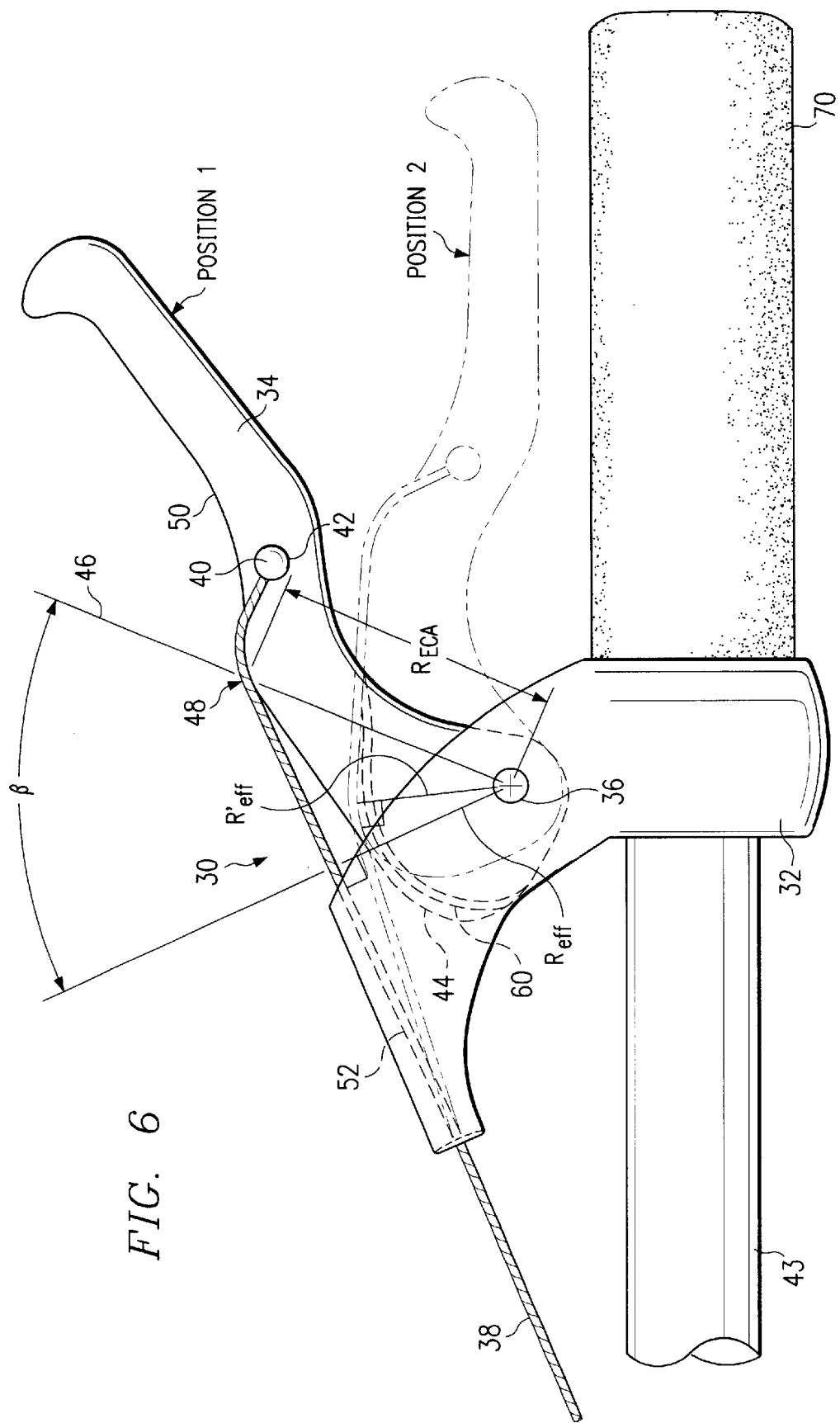
FIG. 6 is an elevational view of a brake lever mechanism according to a first embodiment of the invention.

Referring to FIG. 6, there is shown an embodiment of the brake lever mechanism of the invention. A brake mechanism indicated generally at 30 includes a mounting bracket 32, a brake lever 34, a pivot pin 36 and a brake cable 38. The cable 38 includes a cable end 40 which is adapted to engage the lever socket 42.

The mounting bracket 32 is used to mount the brake mechanism 30 to a bicycle handlebar 43. The cable 38 is entrained through a cable guide 52, which in the illustrated embodiment is formed as a portion of mounting bracket 32 and which is fixed relative to the handlebar 43.

In operation, at Position 1 (i.e, fully retracted) the mechanism 30 has an effective radius, or pivot arm, $R_{EFF}$. In this instance, the effective radius is defined as the perpendicular distance from the pivot 36 to the brake cable 38.

As the lever 34 is rotated about pivot 36 to Position 2 (i.e. almost fully deflected), the cable 38 drops down to the effective spooling radius 44 of the lever 34 to effective radius $R'_{EFF}$. As indicated in FIGS. 5 and 5a, the transition from $R'_{EFF}$ to $R_{EFF}$ is substantially uniform (see Curve 2 In FIGS 5 and 5a), resulting in a substantially uniformly varying mechanical advantage over the lever range of rotation.

After the cable 38 comes in contact with the effective spooling radius 44, the mechanical advantage of the system remains constant. This transition is denoted as T' in FIGS. 5 and 5a.

Figure 7:
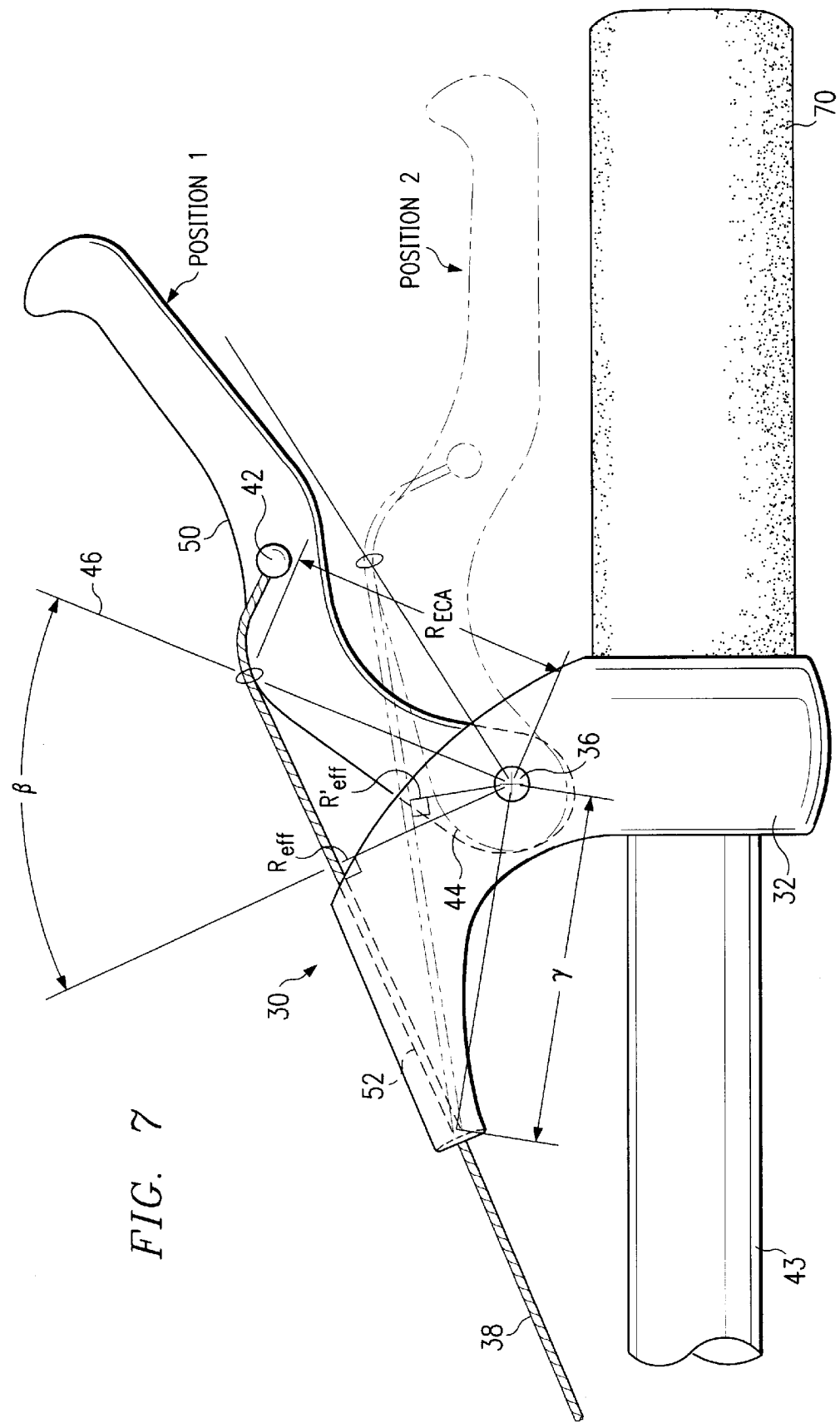
FIG. 7 is an elevational view of a second embodiment of the invention.

Referring to FIG. 7, there is shown another embodiment of the invention. In the noted embodiment, the cable 38 does not contact the effective spooling radius 44 throughout the range of motion from Position 1 to Position 2. Thus, there is no "limiting effect" by the effective spooling radius over the lever range of rotation.

Thus, as will be appreciated by one having ordinary skill in the art, various effective spooling radius configurations may be employed to achieve the desired limiting effect. In additional embodiments, various effective spooling radii may be achieved through the use of one or more user-adjustable separate inserts as depicted by phantom lines 60 in FIG. 6.

Figure 7A:
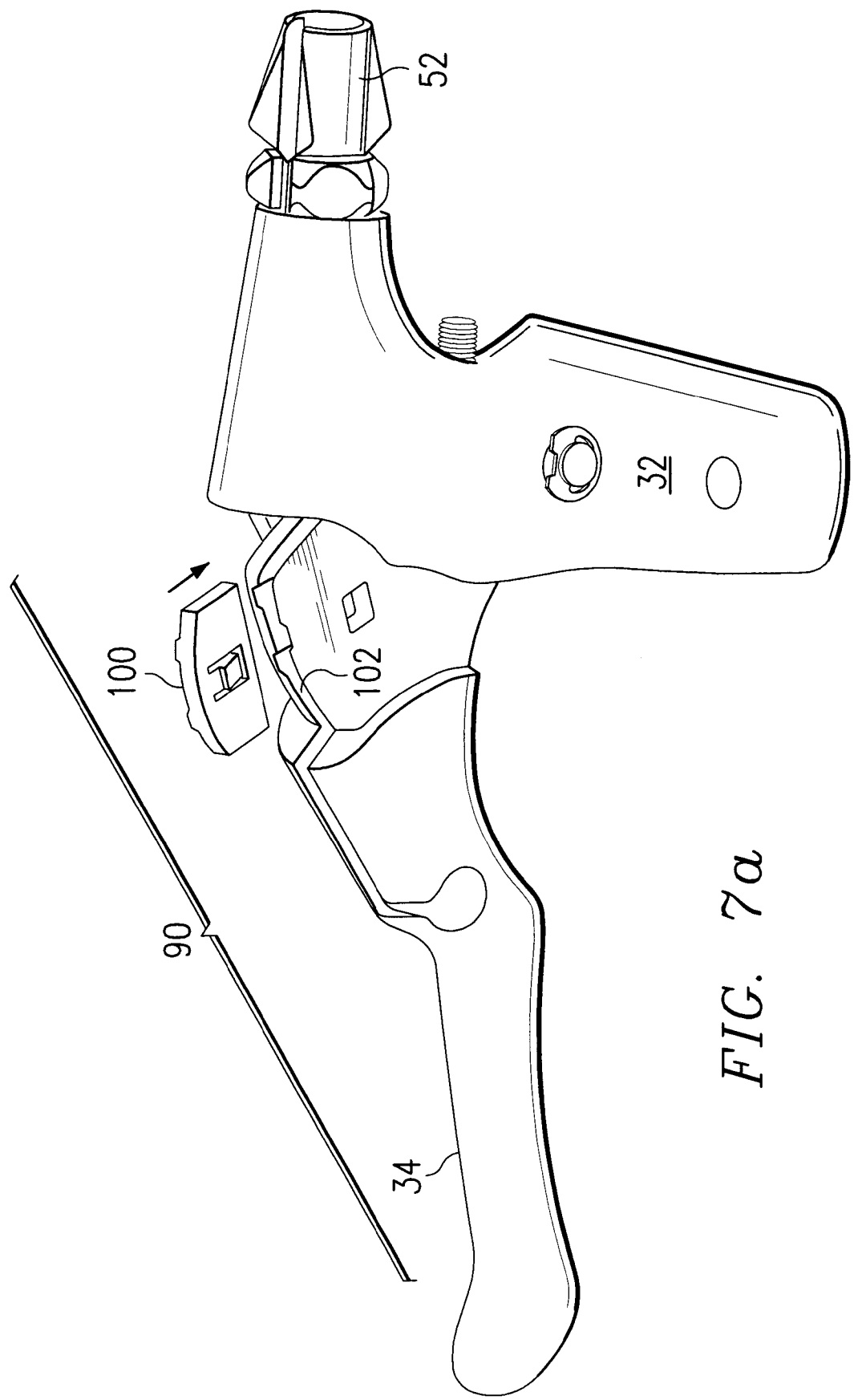
FIG. 7a is an isometric view of a third embodiment of the invention.

Referring to FIG. 7a, there is shown yet another embodiment of the invention indicated generally at 90 where the limiting effect may be user adjusted. In the noted embodiment, a removable insert 100 is slidably received by brake lever 34 through slot 102 thereby allowing the user to achieve the desired limiting effect.

According to the invention, the rate of change of the mechanical advantage is primarily a function of $\beta$ and RECA (see FIG. 6), where $\beta$ is the angle between a line coincident with the effective radius $R_{EFF}$ and line 46 drawn between pivot 36 and the effective cable attachment 48, where $R_{ECA}$ is the distance between pivot 36 and the effective cable attachment 48 along line 46. By the term "effective cable attachment" it is meant the point where the cable contacts the outer periphery 50 of the lever 34 and is tangent thereto. In an additional embodiment, the outer periphery 50 of the lever 34 is contoured from the cable attachment point towards the lever pivot 36 thereby varying the effective cable attachment during lever rotation. Such a device will achieve an increasing mechanical advantage that is nonlinear (not shown in FIG. 5a).

An additional factor that impacts the rate of change of the mechanical advantage of the system is the replacement of a cable guide 52 relative to the pivot 36. Generally the greater the distance between the cable guide 52 (i.e. cable exit) and the lever pivot 36 (denoted γ in FIG. 7), the greater the resulting change in the mechanical advantage.

According to the invention, the mounting bracket 32 and brake lever 34 must be configured to permit the cable 38 to be displaced during lever actuation both along the cable length and in a direction transverse to the cable length so as to achieve the desired increasing mechanical advantage benefits. Additionally, the increase in mechanical advantage must be sufficient to generate enough cable force and braking power. Accordingly, the brake lever device of the invention achieves at least a 33% increase in mechanical advantage over the actuation range of the brake lever 34 from a fully retracted position (e.g., Position 1 in FIGS. 6 and 7) to a fully deflected position (i.e., the point at which the brake lever 34 contacts handlebar grip 70). Furthermore, for the "heart" or most used portion of the lever rotational range, the brake lever 34 of the invention achieves at least a 20% increase in mechanical advantage over the lever actuation from a fully retracted lever position to a 30 degree deflected position. Finally, in rotating from a fully retracted to a fully deflected position, the brake lever 34 is pivoting rotationally outboard with respect to the bicycle frame.

According to the invention, for optimal performance with a V-brake, β ranges from 30°–55° and $R_{ECA}$ ranges from 2.0 to 3.0 inches. More preferably, β equals 45° and $R_{ECA}$ equals 2.3 inches.

For optimum performance with a cantilever brake, β ranges from 30°–50° and $R_{ECA}$ ranges from 1.2 to 2.5 inches. More preferably, β equals 45° and $R_{ECA}$ equals 1.6 inches.

While the forms of apparatus herein described constitute preferred embodiments of the invention, it should be understood that the invention is not limited to these forms of apparatus, and that changes may be made therein without departing from the scope of the invention.

What is claimed is:

1. A brake operating device for a cable actuated bicycle brake, said device comprising:
   a mounting bracket attached to a bicycle handlebar and having a cable guide, and
   a brake lever pivotally attached about a lever pivot to said mounting bracket
   one end of the cable is routed along the cable guide, and directly attached to said brake lever at a fixed point thereby forming an effective cable attachment point,
   said mounting bracket and said brake lever configured and the effective cable attachment point disposed relative to the lever pivot such that actuation of said brake lever about the lever pivot displaces the cable in a direction transverse to the cable length towards the lever pivot,
   an effective radius of the cable being defined as a perpendicular distance from the cable;
   a length of the effective radius when said brake lever is in a fully retracted position being at least 1.33 times as long as a length of said effective radius when the brake lever is in a fully deflected position whereby the brake operating device achieving at least a 33% increase in mechanical advantage over the actuation range of the brake lever from the fully retracted to the fully deflected position.

2. A brake operating device according to claim 1, wherein:
   said brake lever is configured to vary the effective cable attachment point over the actuation range of the brake lever.

3. A brake operating device according to claim 1, wherein:
   said brake lever is configured to substantially limit the increasing mechanical advantage near the end of the actuation range of the brake lever.

4. A brake operating device according to claim 3, further comprising:
   at least one removable insert attached to said brake lever, said insert limiting further transverse cable displacement towards the lever pivot near the end of the actuation range of the brake lever.

5. A brake operating device for a cable actuated bicycle brake, said device comprising:
   a mounting bracket attached to a bicycle handlebar and having a cable guide, and
   a brake lever pivotally attached about a lever pivot to said mounting bracket,
   one end of the cable routed along the cable guide and directly attached to said brake lever at a fixed point thereby forming an effective cable attachment point,
   said mounting bracket and said brake lever configured and the effective cable attachment point disposed relative to the lever pivot such that actuation of said brake lever about the lever pivot transversely displaces the cable towards the lever pivot,
   an effective radius of the cable being defined as a perpendicular distance from the cable to the lever pivot;
   a length of the effective radius when the brake lever is in a fully retracted position being at least 1.20 times as long as a length of the effective radius when the brake lever is in a 30 degree deflected position whereby the brake operating device achieving at least a 20% increase in mechanical advantage over the actuation of said brake lever from the fully retracted to the 30 degree deflected position.

6. A brake operating lever for a cable actuated bicycle brake, said lever comprising:
   said lever pivotally mounted adjacent to a bicycle handlebar about a brake lever pivot and having one end of the cable directly attached to said lever at a fixed point thereby forming an effective cable attachment point,
   said lever configured and the effective cable attachment point disposed relative to the brake lever pivot such that actuation of said brake lever about the lever pivot displaces the cable in a direction transverse to the cable length towards the lever pivot,
   an effective radius of the cable being defined as a perpendicular distance from the cable to the lever pivot;
   a length of the effective radius when the brake lever is in a fully retracted position being at least 1.33 times as long as a length of the effective radius when the brake lever is in a fully deflected position whereby the brake lever effecting at least a 33% increase in mechanical advantage over the actuation range of said brake lever from the fully retracted to the fully deflected position.

7. A brake operating lever according to claim 6, wherein:
   said brake lever is configured to vary the effective cable attachment point over the actuation range of the brake lever.

8. A brake operating lever according to claim 6, wherein:
   said brake lever is configured to substantially limit the increasing mechanical advantage near the end of the actuation range of the brake lever.

9. A brake operating lever according to claim 8, further comprising:
   at least one removable insert attached to the brake lever, said insert limiting further transverse cable displacement towards the lever pivot near the end of the actuation range of the brake lever.

10. A brake operating lever for a cable actuated bicycle brake, said lever comprising:
   said lever pivotally mounted adjacent a bicycle handlebar about a lever pivot and having one end of the cable directly attached to said lever at a fixed point thereby forming an effective cable attachment point,
   said lever configured and the effective cable attachment point disposed relative to the brake lever pivot such that the actuation of said brake lever about the lever pivot displaces the cable in a direction transverse to the cable length towards the lever pivot,
   an effective radius of the cable being defined as a perpendicular distance from the cable to the lever pivot;
   a length of the effective radius when the brake lever is in a fully retracted position being at least 1.20 times as long as a length of the effective radius when the brake lever is in a 30 degree deflected position whereby the brake lever affecting at least a 20% increase in mechanical advantage over the actuation of said brake lever from a fully retracted to a 30 degree deflected position.

11. A brake operating device for a cable actuated bicycle brake, said device comprising
   a mounting bracket attached to a bicycle handlebar about a lever pivot and having a cable guide, and
   a brake lever pivotally attached to said mounting bracket,
   one end of the cable routed along the cable guide and directly attached to said brake lever at a fixed point thereby forming an effective cable attachment point,
   said mounting bracket and said brake lever configured such that when said lever is undeflected the effective cable attachment point is disposed within a range of 1.2 to 3.0 inches, inclusive, relative to the lever pivot,
   and the line formed by the effective cable attachment point and the lever pivot is disposed rotationally outboard within the range of 30 to 55 degrees, inclusive, relative to an effective radius of the cable defined as a perpendicular distance from the cable to the lever pivot;
   a length of the effective radius when the brake lever is in a fully retracted position being at least 1.33 times as long as a length of the effective radius when the brake lever is in a fully deflected position.

12. A brake operating device according to claim 11, wherein, the effective cable attachment point is disposed 2.3 inches relative to the lever pivot, and the line formed by the effective cable attachment point and the lever pivot is disposed rotationally outboard 45 degrees relative to a line perpendicular to the cable going through the lever pivot.

13. A brake operating device according to claim 11, wherein, the effective cable attachment point is disposed 1.6 inches relative to the lever pivot, and the line formed by the effective cable attachment point and the lever pivot is disposed rotationally outboard 45 degrees relative to a line perpendicular to the cable going through the lever pivot.

* * * * *